July 30, 1968  C. G. ROBINSON  3,395,238
POWER COUPLING AND ELECTRODE ARRANGEMENT FOR ELECTRIC FURNACE
Filed May 17, 1965
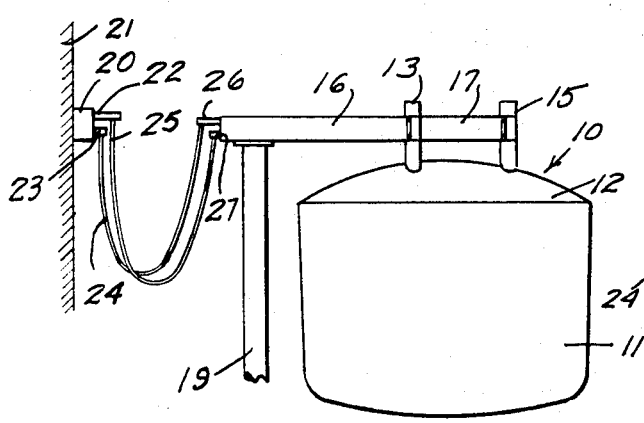
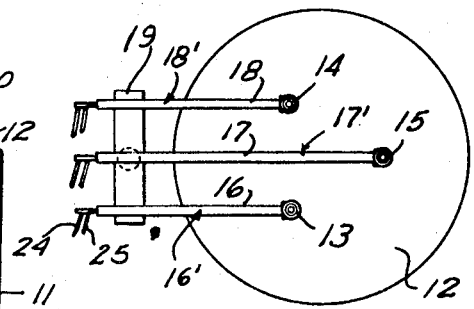
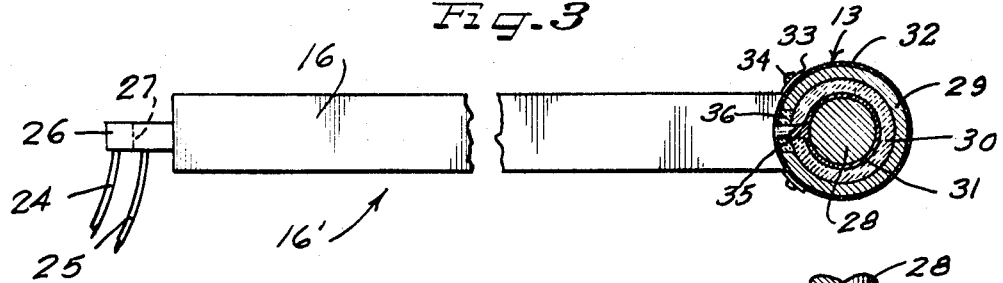
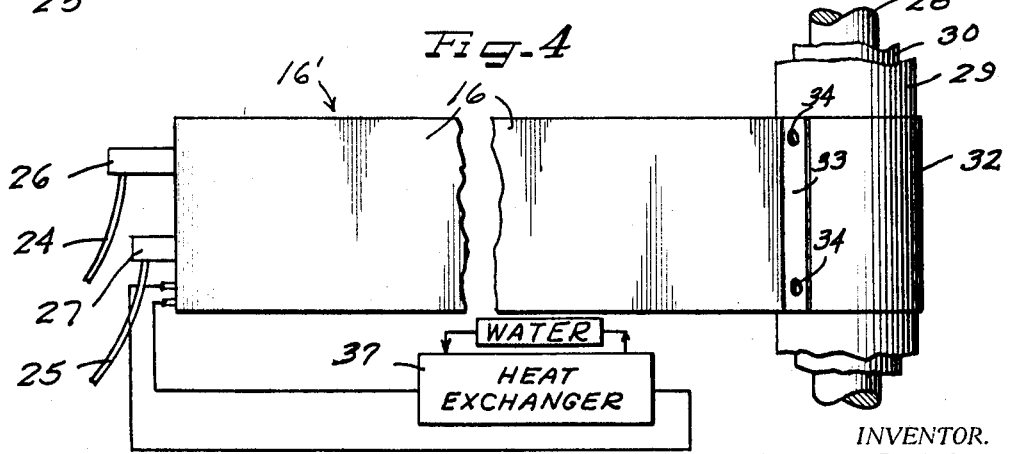
INVENTOR.
Charles G. Robinson
BY ATTORNEYS United States Patent Office 3,395,238
Patented July 30, 1968

3,395,238
POWER COUPLING AND ELECTRODE ARRANGEMENT FOR ELECTRIC FURNACE
Charles G. Robinson, Sterling, Ill., assignor to Northwestern Steel & Wire Company, Sterling, Ill., a corporation of Illinois
Filed May 17, 1965, Ser. No. 456,111
11 Claims. (Cl. 13—9)

This invention relates to electric arc furnaces and more particularly to an electrode and power coupling arrangement which eliminates impedance unbalance problems of multiphase power arrangements as used heretofore in such furnaces.

Electric arc furnaces have found particular use in the production of steel from scrap metal, in arrangements which are now well known in the art. A typical arrangement would have three electrodes included in a three-phase power supply system, the electrodes being maintained in a spaced apart relation to each other. In such installations there is usually provided means for regulating the electrode position so as to maintain equal arc power consumption by varying the length of the arc to the melt, and hence varying the electrical resistance of the arc.

In a normal installation, the electrodes are connected by a three-phase transformer and power cable arrangement to a high voltage three-phase source having a sufficient power capability to sustain the arc. The transformer is typically placed distant from the electrodes, thus requiring lengthy cables from the high current secondary of the transformer to the electrode connections. Since the current in these particular cables is very high, in most instances ranging from 20,000 to 80,000 amperes, a slight unbalance of impedance between the different phases can lead to severe inefficient and uneconomical furnace operation.

In using such a power cable and electrode arrangement, various techniques have been utilized to impedance balance the phases so as to obtain a symmetrical system. One of these techniques consisted of moving the electrode with the highest current away from the melt until its current magnitude is equal to the other two phases. However, the increased distance between the electrode and the melt exposes the refractory lining of the furnace to the intense heat of the resulting long arc, causing the lining to be burned away at an excessive rate and thereby increasing the down time of the furnace. More refined techniques have involved the use of expensive and inefficient balancing transformers, or the use of different diameter and different length high current cables interconnecting the transformer secondary to the individual electrodes in each phase.

These high current cables were then securely maintained a certain prescribed distance from each other. Frequently, the very high current carrying capacity of such cables required the use of water cooling, and various means have been devised to symmetrically space the long lengths of such water cooled cables in order to obtain a balanced impedance between the phases.

It is therefore an object of the present invention to provide an efficient and economical power coupling and electrode arrangement for an electric arc furnace.

It is another object of this invention to provide a power coupling and electrode arrangement for an electric arc furnace wherein a balanced impedance condition is obtained between the different phases.

It is a further object of this invention to provide a power coupling and electrode arrangement for an electric arc furnace wherein the electrodes are directly connected to an electrode power source to provide an impedance balanced condition.

According to the present invention, each phase of a three-phase power source is coupled into the primary of a step-down transformer, the secondary of each transformer is connected to a corresponding concentric electrode pair arrangement, and each transformer is located immediately adjacent its respective electrode pair. The concentric electrode pair arrangement and the placing of each of the transformers immediately adjacent the corresponding electrode pair permits a very short, direct and reactance-free high current carrying connection to be made between the transformer secondary and the electrode pair, thus eliminating impedance unbalancing problems due to long, high current cables.

Other objects and advantages of this invention and a fuller understanding of the nature thereof may be had by referring to the claims and to the following detailed description taken in conjunction with the accompanying drawings.

FIGURE 1 is a fragmentary elevational view in somewhat diagrammatic form showing electrodes being supported by a transformer arm arrangement.

FIGURE 2 is a top plan view showing each concentric electrode pair being supported by a corresponding transformer arm.

FIGURE 3 is a partial sectional view of an individual transformer arm and electrode pair arrangement showing in more detail the construction of a concentric electrode pair arrangement.

FIGURE 4 is a fragmentary elevational view of an individual transformer arm and electrode pair arrangement showing in more detail the connections to the input of the transformer arm.

A typical electric arc furnace consists usually of a large cylindrical housing having a refractory lining and is provided with a set of three movable carbon electrodes supported by horizontal arms which can be adjusted vertically so as to move the carbon electrodes with respect to the top surface of scrap steel or other material to be melted in the furnace. The basic electrical circuit of the arc furnace comprises a source of high voltage-low current electrical power connected to the primary of a step-down transformer, the relatively low voltage-extremely high current secondary of the transformer being connected to the top of the movable electrodes.

In FIGURE 1 there is shown a typical electric arc furnace 10 having a cylindrical refractory lined furnace chamber 11 with a top 12 which may be swung to an open position in order to recharge the furnace. Projecting vertically down through the top 12 is a group of three concentric pair electrodes 13, 14 and 15. The electrode 14 is not seen in this view since it is directly behind the electrode 13. A number of transformer arms 16, 17 and 18 are secured respectively to the electrodes 13, 14 and 15. Thus, each of the transformer arms 16–18 supports a respective pair electrode within the furnace chamber 11. A frame 19 supports the transformer arms 16–18 and proper means (not shown) may be utilized to move the frame 19 so that the pair electrodes 13–15 can be vertically positioned.

Each of the transformer arms 16–18 encloses respectively step-down transformers 16', 17' and 18', which interconnect the high voltage power input to the respective pair electrodes 13, 14 and 15.

The multi-phase power input source is coupled to a connector mounting panel 20 which is mounted on a wall 21. On the connector mounting panel 20 there is mounted a pair of connecting terminals 22 and 23 which are to be connected to the primary of one of the transformers 16' 17' or 18'. Although FIGURE 1 illustrates only one pair of terminals 22, 23 mounted on the mounting panel 20, it is to be understood that similar sets of pair terminals are provided on the mounting panel 20 for each of the transformers. The terminals 22, 23 are connected across one phase of multi-phase power input source. For example, in a delta connected three-phase input there would be three pairs of connecting terminals such as 22, 23 mounted on the mounting panel 20, each pair of the terminals 22, 23 connected across a separate phase of the three-phase input.

The high voltage input across terminals 22, 23 is connected by a pair of cables 24, 25 to a pair of transformer input primary terminals 26, 27. FIGURE 1 illustrates the connection to terminals 26, 27 which are internally connected to transformer 16' contained within transformer arm 16. FIGURE 2 shows more clearly the connection of separate phases of the input power source to transformers 17' and 18' enclosed respectively in transformer arms 17 and 18. Thus a high voltage-relatively low current connection is made from each phase of the multi-phase input source to the primary winding of a respective step-down transformer.

In FIGURE 3 there is shown in more detail the connection of high voltage cables 24, 25 to the input terminals 26, 27 which are connected to the primary winding of transformer 16' enclosed within the transformer arms 16. The secondary winding of transformer 16' is connected to a concentric pair electrode 13. It will be understood that similar connections are made to the primary and secondary of transformers 17' and 18', so that for description purposes only the connections to transformer 16' will be described.

Concentric pair electrode 13 consists of an inner electrode 28 and a concentric outer electrode 29 separated by a suitable insulator 30 such as ceramic. The electrodes 28 and 29 are formed of carbon, however, they can also be formed of high conductivity metals such a silver and copper. Also, it is understood that when vacuum melting is employed the electrodes 28 and 29 can be constructed of consumable material, such as exotic steels, and in such cases the ceramic insulator 30 could act both as an insulator and as a flux or catalyst for vacuum arc melting of the rare and exotic metals.

In the embodiment illustrated, an inner electrode clamping ring 31 is tightly clamped around the inner electrode 28 so as to form an electrical connection thereto. An insulated mounting ring 32 tightly clamps on the outer electrode 29, and permits the electrode 13 to be supported by a pair of ears 33 and fasteners 34 to the transformer arm 16.

The ring 31 enters the transformer arm 16 via a lead 35 to connect to one side of the secondary of transformer 16'. The other secondary side of the transformer 16' is also connected within the transformer arm 16 to the electrode 29, and a suitable insulator 36 prevents shorting of the electrode 29 to the lead 35. More elaborate means may, of course, be utilized to mount each electrode pair to the corresponding transformer arm without causing undesirable short circuiting of the electrodes at points outside of the furnace chamber 11.

Using any suitable means to thus mount each of the transformers immediately adjacent the corresponding pair electrodes, a direct and substantially non-reactive coupling is provided between the high current transformer secondary and the pair of electrodes.

Because of the high current in the secondary of transformer 16', sufficient cooling means must be supplied to the transformers 16', 17', and 18'. As is diagrammatically shown in FIGURE 4 a heat exchange 37 is used to circulate a coolant, such as oil, through the transformer 16'. Oil which has been heated by passing through the transformer 16' may be lowered in temperature by a water cooling arrangement of the type well known in the art.

Although the drawings and specification present a detailed disclosure of a preferred embodiment of the present invention, it is to be understood that the invention is not limited to the specific forms disclosed, but covers all modifications, changes and alternative constructions falling within the scope of the principles taught by the invention.

I claim:

1. An electric arc furnace having a chamber, a plurality of electrodes in said chamber each having two conductors insulated from each other, means for supporting said electrodes, and a multi-phase power source comprising
   a transformer for each phase of said power source, each transformer securely mounted to said support means immediately adjacent a corresponding one of said electrodes, with the primary winding of each of said transformers coupled to one phase of said power source, and the secondary windings of each transformer directly coupled to the two conductors of the respective electrode to form a non-reactive coupling therebetween.

2. In an electric arc furnace,
   a furnace chamber,
   a multi-phase power source,
   a plurality of concentric pair electrodes, one for each of said phases,
   means for adjustably supporting said electrodes within said chamber, and a transformer for each phase of said power source, each transformer securely mounted to said support means immediately adjacent to a corresponding one of said concentric pair electrodes, the primary winding of each transformer coupled to one phase of said power source, and the secondary winding of each transformer directly coupled to the corresponding electrode of said concentric pair electrode to form a non-reactive coupling between the secondary of said transformers and said electrodes.

3. In an electric arc furnace,
   a furnace chamber,
   a plurality of concentric pair electrodes,
   means for supporting said electrodes in said chamber,
   a multi-phase electrical power source, and
   a transformer for each phase of said power source,
   each transformer mounted immediately adjacent to a corresponding one of said concentric pair electrodes, the primary winding of each transformer coupled to one phase of said power source, and the secondary winding of each transformer directly coupled to the corresponding electrode of said concentric pair electrodes to form a non-reactive coupling between said transformer secondary and said electrodes.

4. In an electric arc furnace,
   a furnace chamber,
   three concentric pair electrodes,
   means for adjustably supporting said electrodes within said chamber,
   a three-phase electrical power source, and a transformer for each phase of said power source, each transformer securely mounted to said support means immediately adjacent a corresponding one of said concentric pair electrodes, the primary winding of each transformer coupled to one phase of said power source, and the secondary winding of each transformer directly coupled to the corresponding electrode of said concentric pair electrode to form a non-reactive coupling between said transformer secondary and said electrodes.

5. In an electric arc furnace,
   a furnace chamber,
   a plurality of electrodes, each including a conductive inner electrode portion,
   a conductive outer electrode concentric with said inner electrode,
   and an insulator portion between said inner and outer electrodes,
   means for supporting said concentric pair electrodes within said chamber,
   a multi-phase electrical power source, and a transformer for each phase of said power source, each transformer mounted immediately adjacent to a corresponding one of said electrodes, the primary winding of each of said transformers coupled to one phase of said power source, and the secondary winding of each transformer directly coupled to the corresponding inner and outer electrode of the respective concentric pair electrodes to form a non-reactive coupling between said transformer secondary and said electrodes.

6. In an electric arc furnace,
a furnace chamber,
a plurality of electrodes, each including a conductive inner electrode portion,
a conductive outer electrode concentric with said inner electrode,
and an insulator portion between said inner and outer electrodes,
means for supporting said concentric pair electrodes within said chamber,
a multi-phase electrical power source, and a transformer for each phase of said power source, each transformer securely mounted to said support means immediately adjacent a corresponding one of said electrodes, the primary winding of each of said transformers coupled to one phase of said power source, and the secondary winding of each transformer directly coupled to the corresponding inner and outer electrode of the respective concentric pair electrodes to form a non-reactive coupling between said transformer secondary and said electrodes.

7. In an electric arc furnace,
a furnace chamber,
a plurality of concentric pair electrodes, each of said pair electrodes including a cylindrical conductive inner electrode, a hollow cylindrical conductive outer electrode concentric with said inner electrode,
insulating means between said inner and outer electrodes,
means for adjustably supporting said electrodes in said chamber,
a multi-phase electrical power source, and a transformer for each phase of said power source, each transformer securely mounted to said support means immediately adjacent a first end of a corresponding one of said concentric pair electrodes, the primary winding of each transformer coupled to one phase of said power source, one end of the secondary winding of each transformer directly coupled to said inner electrodes, the other end of said secondary winding of each transformer directly coupled to the outer electrode to form a non-reactive coupling between said transformer secondary and said concentric pair electrodes.

8. In an electric arc furnace,
a furnace chamber,
three concentric pair electrodes, each including an inner cylindrical carbon electrode,
a hollow cylindrical outer carbon electrode concentric with said inner electrode,
and insulating means between said inner and outer electrodes,
means for adjustably supporting said electrodes within said chamber,
a three-phase electrical power source, and three voltage step-down transformers, one for each phase of said power source,
each transformer securely mounted to said support means immediately adjacent a corresponding one of said concentric pair electrodes, the primary winding of each of said transformers coupled to one phase of the power source, with one end of the secondary winding of each transformer directly coupled to said inner carbon electrode, and the other end of the secondary winding of each transformer directly coupled to the outer carbon electrode to form a non-reactive coupling between said transformer secondary and said electrodes.

9. A concentric pair electrode arrangement for use in a furnace chamber of an electric arc furnace, said arrangement comprising:
an inner high current electrode,
an outer high current electrode concentric to and radially spaced from said inner electrode, and
an insulator interposed between said concentric inner and outer electrodes to prevent said electrodes from electrical contact at points outside of said furnace chamber.

10. A concentric pair electrode arrangement for use in a furnace chamber of an electric arc furnace, said arrangement comprising:
an inner high conductive metal electrode,
an outer high conductive metal electrode concentric to and radially spaced from said inner electrode, and
a ceramic insulator interposed between said concentric inner and outer electrodes to prevent said electrodes from electrical contact at points outside of said furnace chamber.

11. A concentric pair electrode arrangement for use in a vacuum melting electric arc furnace, said electrode arrangement comprising:
an inner high current consumable electrode;
an outer high current consumable electrode concentric to and radially spaced from said inner electrode; and
a ceramic insulator interposed between said concentric inner and outer electrodes, said
ceramic insulator providing a catalytic action in said furnace.

References Cited

UNITED STATES PATENTS

| | | | |
|---|---|---|---|
| 1,127,475 | 2/1915 | Marshall | 13—9 |
| 1,242,971 | 10/1917 | Peters | 13—12 |
| 2,368,998 | 2/1945 | Nissim | 13—9 |
| 2,902,524 | 9/1959 | Paxton | 13—6 |

BERNARD A. GILHEANY, *Primary Examiner.*

H. B. GILSON, *Assistant Examiner.*